(12) United States Patent  
Gunderman et al.

(10) Patent No.: US 9,124,105 B2  
(45) Date of Patent: Sep. 1, 2015

(54) WIRELESS CHARGING SHELF

(76) Inventors: Bryce Robert Gunderman, Honeoye Falls, NY (US); Robert Dale Gunderman, Honeoye Falls, NY (US)

( * ) Notice: Subject to any disclaimer, the term of this patent is extended or adjusted under 35 U.S.C. 154(b) by 924 days.

(21) Appl. No.: 12/961,691

(22) Filed: Dec. 7, 2010

(65) Prior Publication Data

US 2012/0139484 A1 Jun. 7, 2012

(51) Int. Cl.
*H02J 7/00* (2006.01)
*H02J 7/02* (2006.01)

(52) U.S. Cl.
CPC ............... *H02J 7/0044* (2013.01); *H02J 7/025* (2013.01)

(58) Field of Classification Search
USPC .................. 320/107, 108, 110, 112, 113, 138
See application file for complete search history.

(56) References Cited

U.S. PATENT DOCUMENTS

| | | | |
|---|---|---|---|
| 5,521,967 A * | 5/1996 | Novas et al. | 379/100.14 |
| 5,596,567 A * | 1/1997 | deMuro et al. | 320/106 |
| 5,874,723 A * | 2/1999 | Hasegawa et al. | 235/472.01 |
| 5,923,544 A * | 7/1999 | Urano | 363/22 |
| 6,478,440 B1 * | 11/2002 | Jaworski et al. | 362/96 |
| 6,495,988 B1 * | 12/2002 | Liao | 320/111 |
| 6,498,456 B2 * | 12/2002 | Ettes et al. | 320/108 |
| 6,762,585 B2 * | 7/2004 | Liao | 320/107 |
| 7,271,569 B2 * | 9/2007 | Oglesbee | 320/108 |
| 7,495,414 B2 * | 2/2009 | Hui | 320/108 |
| 7,812,257 B2 | 10/2010 | Gunderman et al. | |
| 8,868,939 B2 * | 10/2014 | Matsuoka et al. | 713/300 |
| 2003/0137276 A1 * | 7/2003 | Lin | 320/115 |
| 2004/0145342 A1 * | 7/2004 | Lyon | 320/108 |
| 2008/0061735 A1 * | 3/2008 | Toya et al. | 320/108 |
| 2008/0258679 A1 * | 10/2008 | Manico et al. | 320/106 |
| 2009/0058361 A1 * | 3/2009 | John | 320/128 |
| 2009/0284227 A1 * | 11/2009 | Mohammadian et al. | 320/137 |
| 2010/0039066 A1 | 2/2010 | Yuan et al. | |
| 2010/0065297 A1 * | 3/2010 | Gunderman et al. | 174/66 |
| 2010/0081473 A1 * | 4/2010 | Chatterjee et al. | 455/559 |
| 2010/0264871 A1 * | 10/2010 | Matouka et al. | 320/108 |

OTHER PUBLICATIONS

Lynn Fetzer-Westmeister, The power shelf, Sep. 21, 2009, buypowershelf.com.*

* cited by examiner

*Primary Examiner* — Drew A Dunn
*Assistant Examiner* — Steve T Chung
(74) *Attorney, Agent, or Firm* — Patent Technologies, LLC; Robert D. Gunderman, Jr.

(57) ABSTRACT

A wireless charging shelf is described where a charging surface with a wireless power transmission structure is coupled with an electrical connector, providing a truly wireless charging solution. The wireless charging shelf may have a plug for installation in an electrical receptacle, or may be part of a cover plate for replacing an existing cover plate with a wireless charging shelf cover plate.

18 Claims, 17 Drawing Sheets

WIRELESS CHARGING SHELF

BACKGROUND OF THE INVENTION

1. Field of the Invention

This invention relates generally to wireless charging, and more particularly to a wireless charging shelf.

2. Description of the Related Art

With the proliferation of electronic devices such as cell phones, MP3 players, handheld email and text messaging devices, handheld or pocket PCs, and the like, there exists an ongoing need to recharge the batteries in these devices on a regular and ongoing basis. The proliferation of these rechargeable electronic devices create a great deal of clutter in one's living space or office space that, when combined with charging cords, cradles, interface cords, and the like, can become unmanageable or at the least create disorganization. When one charges these devices, an electrical outlet that is at a convenient height with a counter or other surface, is usually used. This outlet is most often located in the kitchen or bathroom, as most remaining electrical outlets in a home are located close to the floor. Unfortunately, this means that cell phones are commonly charged in the kitchen or bathroom, and take up valuable counter space. The clutter of electronic devices, chargers, and cables also creates a less than desirable visual landscape in one's home. In the past, there have been attempts to manage this situation through the use of charging cradles or charging stands. Unfortunately, while creating a neater visual appearance, these cradles and stands still take up valuable counter space.

Recently wireless charging mats have been manufactured that claim to eliminate the clutter associated with chargers and cords; this clutter fondly known by some as "black spaghetti". Unfortunately, while these wireless charging mats claim to eliminate cord clutter, in reality there is a cord from the charging mat to a wall outlet, thereby only replacing one cord with another. In addition, these wireless charging mats are placed on a counter, desk or other flat surface, taking up space and merely adding one more gadget to the clutter. Heretofore, a truly wireless charging solution has not existed. While the transmission of electric energy has been known and experimented with for more than 100 years, it has never seen commercial success. Nikola Tesla, for example, worked extensively with the transmission of electric energy without wires. He published numerous papers on his findings. For example, "The True Wireless" as published in the Electrical Experimenter, May 1919, and "The Transmission of Electric Energy Without Wires" as published in Electrical World and Engineer on Mar. 5, 1904.

The present invention and the various embodiments described and envisioned herein solve the need for a truly wireless charging solution for electronic devices.

It is therefore an object of the present invention to provide a wireless charging shelf for electronic devices that eliminates the electronic clutter found on many counter, desk and other surfaces. It is another object of the present invention to provide a wireless charging shelf where loose wires are not required between the charging surface and the electrical connector. It is yet another object of the present invention to provide a wireless charging shelf having operational logic. It is yet another object of the present invention to provide a cover plate with a wireless charging shelf. It is further an object of the present invention to provide a system for charging an electronic device having a wireless charging shelf. It is yet another object of the present invention to provide a wireless charging shelf and an electronic device having a wireless power receiver. These and other objects of the present invention are not to be considered comprehensive or exhaustive, but rather, exemplary of objects that may be ascertained after reading this specification with the accompanying drawings and claims.

BRIEF SUMMARY OF THE INVENTION

In accordance with the present invention, there is provided a wireless charging shelf comprising an electrical connector and a charging surface comprising a wireless power transmission structure, the charging surface further attached proximate to said electrical connector.

The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which.

Figure 1:
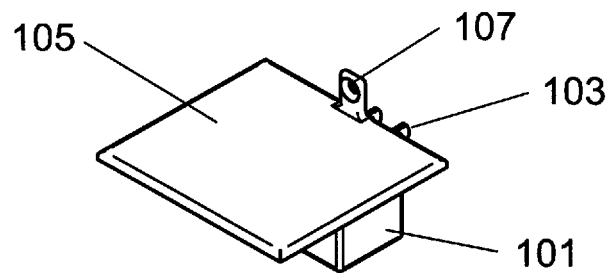
FIG. 1 is a perspective view of the wireless charging shelf according to one embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings, and the appended claims.

DESCRIPTION OF THE PREFERRED EMBODIMENTS

For a general understanding of the present invention and the various embodiments described or envisioned herein, reference is made to the drawings. In the drawings, like reference numerals have been used throughout to designate identical elements.

As used herein, the term "wireless charging" and "wireless power transmission" refer to the transmission of electrical energy without wires using electromagnetic induction, resonance, radiofrequency, or other techniques. The applicants do not wish to be bound to any particular form of wireless power transmission in the disclosure of their invention, the specifics of which are contained as follows. Examples of wireless power transmission include inductive, resonance, and radiofrequency. Wireless charging uses wireless power transmission that is in turn received by an electronic device having some form of energy storage that requires charging, such as a battery, ultracapacitor, or the like.

This specification clearly describes several exemplary embodiments of the present invention through both written description and numerous drawings. Changes to physical form, electronic circuitry, features and functionality may become evident to one after reading this disclosure, the purpose of which is to in fact create such a thought process. These changes, however, merely build upon the broader scope of the present invention, which includes, but is not limited to, a truly wireless charging solution that heretofore has not been attained in the industry. For further example, some electrical receptacles are installed in a horizontal position. The wireless charging shelf may be adapted to such a configuration by essentially rotating the charging shelf ninety degrees in placement with respect to the plug, and perhaps altering other geometries slightly to accommodate such a horizontal receptacle placement. These and other modifications will become apparent after reading this specification and evaluating a given or proposed use, and are considered within the scope of the present invention and its various embodiments. The placement of a charging shelf in close proximity to a plug or other source of electrical power eliminates the cord that is prevalent in today's charging mats, docking stations, and related wireless power products. For clarity and to exemplify rather than limit the multitude of variations possible on this truly wireless solution of the present invention, various embodiments are depicted in the drawings and accompanying specification. These exemplary but not limiting embodiments include placement of the charging shelf on an electrical plug as well as placement of the charging shelf on an outlet cover plate. Placement of a shelf on an outlet cover plate is described in U.S. Pat. No. 7,812,257 to Gunderman et al, the entire disclosure of which is incorporated herein by reference.

Figure 2:
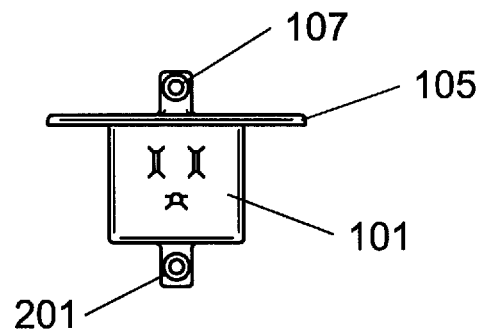
FIG. 2 is a front plan view of the wireless charging shelf of FIG. 1.

Turning to FIG. 1, a perspective view of the wireless charging shelf according to one embodiment of the present invention is depicted. A plug 101 is evident. The plug may either accommodate Alternating Current or Direct Current or variations thereof, although the prevalent power distribution system of today is based on Alternating Current (AC). The plug 101 removably connects the wireless charging shelf to a wall socket, power point, power socket, electric receptacle, plug socket, electrical outlet, or the like, each of these terms being used to describe similar structures. The plug 101 typically has exposed contacts 103, but may also, in some embodiments, have sockets or related female contact structures. It should be noted that while the plug 101 is for removable use, it may be desirable to secure the plug 101 and related structure to the electrical receptacle. Therefore, a retainer is provided that allows one to use an existing fastener on the electrical receptacle to secure the wireless charging shelf, eliminating the risk of it becoming unplugged and falling from the wall along with the device. The plug 101 may be of North American standards, or may comply with other standards. The plug 101 may be of various types, including but not limited to Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. The charging shelf 105 is located in proximity to the plug 101 and in son embodiments of the present invention is mechanically or otherwise coupled to the plug 101. As evident in FIGS. 1-32, the plug is rendered incapable of rotating with respect to the charging surface of the charging shelf to allow an electronic device to safely rest on the charging surface of the charging shelf. The charging shelf contains a radiating structure such as a coil, coils, inductive, resonant, radiofrequency or other component to allow for the wireless mission of electrical power. The shelf may be made of a plastic with these components embedded or otherwise contained therein. The coil, coils, inductive, resonant, radiofrequency or other components are electrically connected to the contacts 103. There may also be intermediary electronics or electrical components to further process the receptacle power before the power traverses the coils, inductive, resonant, radiofrequency or other components. These components are not shown in FIG. 1 as they are embedded within the charging shelf 105. Techniques to retain a device being charged on the wireless charging shelf, such as a lip or an edge on the shelf, may be used. In addition, a non-slip surface may be applied to the shelf 105. Examples of non-slip surfaces include elastomeric materials such as a thermoplastic elastomer. An example of a thermoplastic elastomer is SANTOPRENE™ from Advanced Elastomer Systems. Akron, Ohio. In use, a device containing the appropriate receiver is placed on the charging shelf and power is transferred from the charging shelf to a receiver in the device and then on to charging and storage circuitry within or attached to the device. To prevent the plug 103 and associated charging shelf 105 from being pulled from the electrical receptacle and falling, retainers are provided to allow the placement of an existing fastener from the electrical receptacle through the retainer. An upper retainer 107 is depicted in FIG. 1 that would provide fastening to a Decora® or decorator style electrical receptacle. Decora® is a registered trademark of Leviton Manufacturing Company of Little Neck, N.Y. In FIG. 2, a lower retainer 201 is depicted that would provide fastening to a traditional duplex style electrical receptacle. Other locations and placement of retainers may also be present in various embodiments of the present invention. The retainers may be made from a plastic, a metal, or similar materials. To use the wireless charging shelf, the contacts 103 are inserted into an appropriate electrical receptacle, a retainer or retainers such as the upper retainer 107 or the lower retainer 201 receive a fastener from the electrical receptacle, and the wireless charging shelf may then be used to charge an electronic device with an appropriate wireless power receiver. In some embodiments, only one retainer is used and the other broken off or otherwise removed, or the wireless charging shelf is made available with only an upper or a lower retainer, or a similar retainer is used to ensure safety. The wireless charging shelf may be may be molded using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. Other materials such as metal for contacts and wiring, and other electrical components, may be used.

Figure 3:
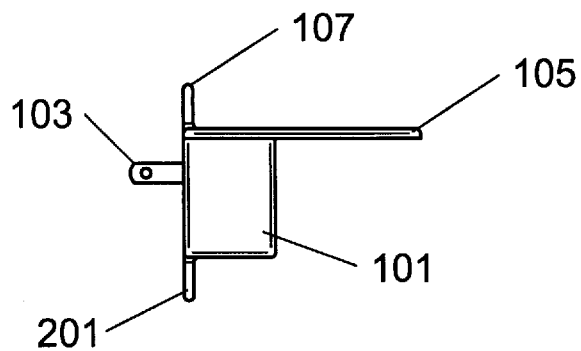
FIG. 3 is a side view of the wireless charging shelf of FIG. 1.
Figure 4:
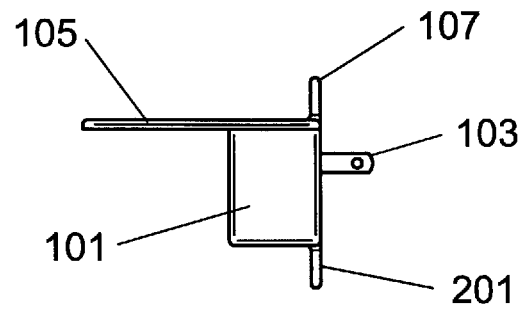
FIG. 4 is an opposing side view of the wireless charging shelf of FIG. 1.
Figure 5:
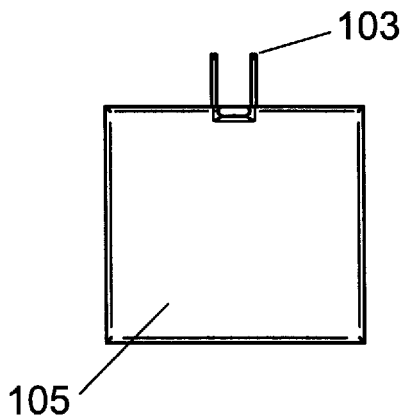
FIG. 5 is a top down view of the wireless charging shelf of FIG. 1.
Figure 6:
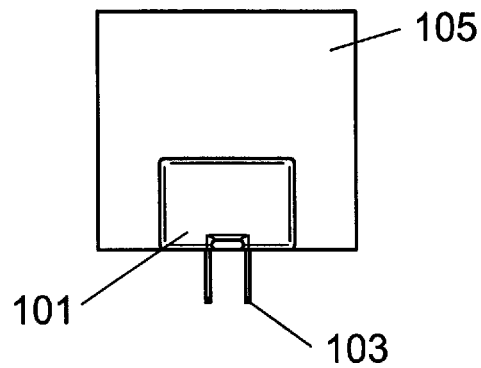
FIG. 6 is a bottom up view of the wireless charging shelf of FIG. 1.

FIG. 2 is a front plan view of the wireless charging shelf of FIG. 1 showing clearly both an upper retainer 107 and a lower retainer 201. In various embodiments, one retainer may be present or the retainer may be placed and configured differently from that shown in FIG. 2. FIG. 3 is a side view of the wireless charging shelf of FIG. 1 and FIG. 4 is an opposing side view of the wireless charging shelf of FIG. 1. FIG. 5 is a top down view of the wireless charging shelf of FIG. 1 showing clearly the charging surface of the charging shelf 105. The charging surface may contain alignment marks, decorative features, non-slip material, a slight pitch to ensure retention of the device, magnets for retention of a device or sensing the presence of a device, lips or otherwise raised edges to ensure that the device is retained, or other similar features. The charging shelf 105 may also vary in shape and size to accommodate different electronic devices. Further, in some embodiments, there may be multiple charging shelves to allow for simultaneous charging of more than one device. FIG. 6 is a bottom up view of the wireless charging shelf of FIG. 1 showing the plug 101 and the contacts 103.

Figure 7:
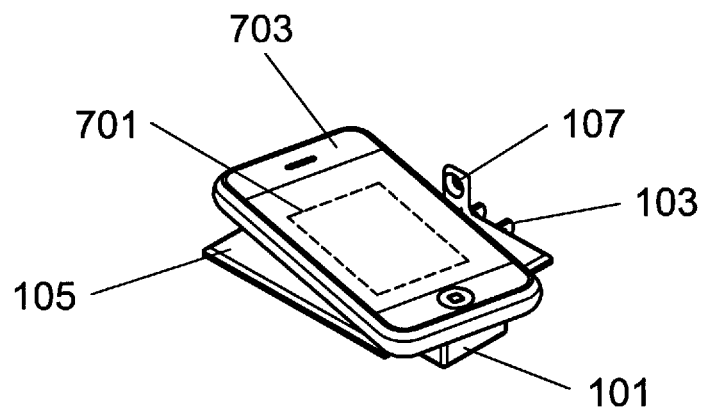
FIG. 7 shows the wireless charging shelf of FIG. 1 in use.

Now turning to FIG. 7, the wireless charging shelf of FIG. 1 is shown in use. For clarity, the electrical receptacle and related building or wall structure is not depicted. The device 703 contains a receiver 701 which contains a coil, coils, inductive, resonant, radiofrequency or other components to allow for the wireless reception of electrical power. The receiver 701 may be built into a battery cover or other structure, built into the device itself, or otherwise electrically coupled to charging circuitry and related electrical storage. For a better understanding of the electrical and electronic aspects of the present invention, FIGS. 33 and 34 will be described in detail later in this specification.

Figure 8:
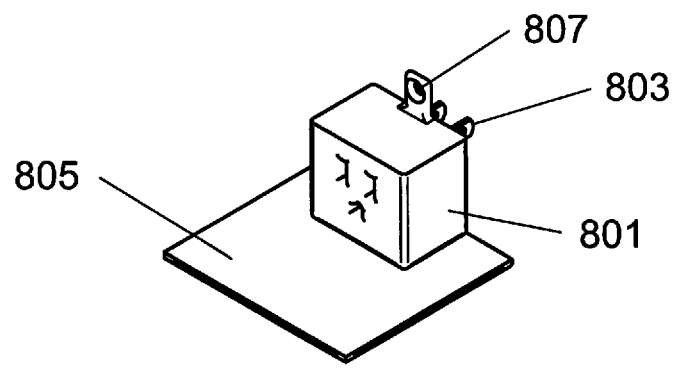
FIG. 8 shows the wireless charging shelf with the charging surface located below the electrical connector.

FIG. 8 shows the wireless charging shelf with the charging surface located below the electrical connector. Similar to FIG. 1, a plug 801 is depicted with contacts 803, a charging shelf 805 and retainer 807. Variations on geometry, materials, and physical structure may be made without departing from the spirit and scope of the present invention.

FIGS. 1-8 depict the wireless charging shelf with a spare or available electrical receptacle contained in the plug 101 or 801. This spare electrical receptacle is electrically connected to the contacts 103 or contacts 803 and provides for an available electrical outlet for other uses. In this way the wireless charging shelf also does not encumber the use of available electrical outlets. This electrical receptacle may be of any type including but not limited to, Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. In addition, this electrical receptacle may also be of a low power standard such as USB or the like, or may contain communications, signaling, data or the like.

Figure 9:
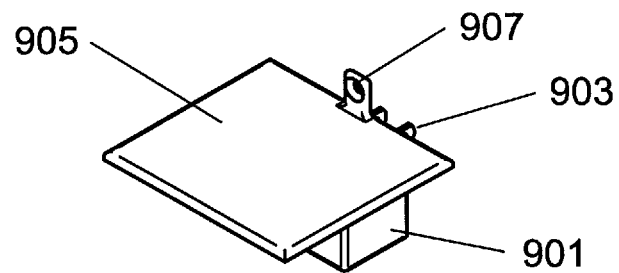
FIG. 9 is a perspective view of the wireless charging shelf according to another embodiment of the present invention.

Turning now to FIG. 9 and related FIGS. 10-15 and 16, a perspective view of the wireless charging shelf according to another embodiment of the present invention is depicted. FIGS. 9-15 are similar to FIGS. 1-7, the difference being primarily that there is not a spare or available electrical receptacle contained in the plug 901 or 1601.

Figure 10:
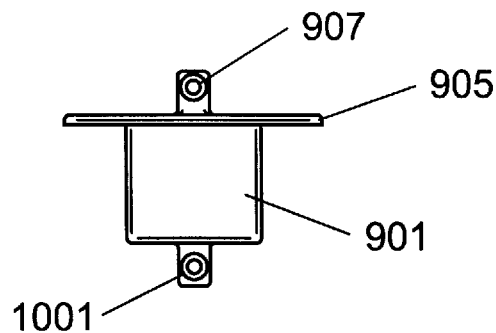
FIG. 10 is a front plan view of the wireless charging shelf of FIG. 9.

FIG. 9 is a perspective view of the wireless charging shelf according to another embodiment of the present invention. A plug 901 is evident. The plug may either accommodate Alternating Current or Direct Current or variations thereof, although the prevalent power distribution system of today is based on Alternating Current (AC). The plug 901 removably connects the wireless charging shelf to a wall socket, power point, power socket, electric receptacle, plug socket, electrical outlet, or the like, each of these terms being used to describe similar structures. The plug 901 typically has exposed contacts 903, but may also, in some embodiments, have sockets or related female contact structures. It should be noted that while the plug 901 is for removable use, it may be desirable to secure the plug 901 and related structure to the electrical receptacle. Therefore, a retainer is provided that allows one to use an existing fastener on the electrical receptacle to secure the wireless charging shelf, eliminating the risk of it becoming unplugged and falling from the wall along with the device. The plug 901 may be of North American standards, or may comply with other standards. The plug 901 may be of various types, including but not limited to, Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. The charging shelf 905 is located in proximity to the plug 901, and in some embodiments of the present invention is mechanically or otherwise coupled to the plug 901. The charging shelf contains a radiating structure such as a coil, coils, inductive, resonant, radiofrequency or other components to allow for the wireless transmission of electrical power. The shelf may be made of a plastic with these components embedded or otherwise contained therein. The coil, coils, inductive, resonant, radiofrequency or other components are electrically connected to the contacts 903. There may also be intermediary electronics or electrical components to further process the receptacle power before the power traverses the coils, inductive, resonant, radiofrequency or other components. These components are not shown in FIG. 9 as they are embedded within the charging shelf 905. Techniques to retain a device being charged on the wireless charging shelf, such as a lip or an edge on the shelf, may be used. In addition, a non-slip surface may be applied to the shelf 905. Examples of non-slip surfaces include elastomeric materials such as a thermoplastic elastomer. An example of a thermoplastic elastomer is SANTOPRENE™ from Advanced Elastomer Systems, Akron, Ohio. In use, a device containing the appropriate receiver is placed on the charging shelf and power is transferred from the charging shelf to a receiver in the device and then on to charging and storage circuitry within or attached to the device. To prevent the plug 903 and associated charging shelf 905 from being pulled from the electrical receptacle and falling, retainers are provided to allow the placement of an existing fastener from the electrical receptacle through the retainer. An upper retainer 907 is depicted in FIG. 9 that would provide fastening to a Decora® or decorator style electrical receptacle. Decora® is a registered trademark of Leviton Manufacturing Company of Little Neck, N.Y. In FIG. 10, a lower retainer 1001 is depicted that would provide fastening to a traditional duplex style electrical receptacle. Other locations and placement of retainers may also be present in various embodiments of the present invention. The retainers may be made from a plastic, a metal, or similar materials. To use the wireless charging shelf, the contacts 903 are inserted into an appropriate electrical receptacle, a retainer or retainers such as the upper retainer 907 or the lower retainer 1001 receive a fastener from the electrical receptacle, and the wireless charging shelf may then be used to receive an electronic device with an appropriate wireless power receiver. In some embodiments, only one retainer is used and the other broken off or otherwise removed, or the wireless charging shelf is made available with only an upper or a lower retainer, or a similar retainer is used to ensure safety. The wireless charging shelf may be may be molded using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. Other materials such as metal for contacts and wiring, and other electrical components, may be used.

Figure 11:
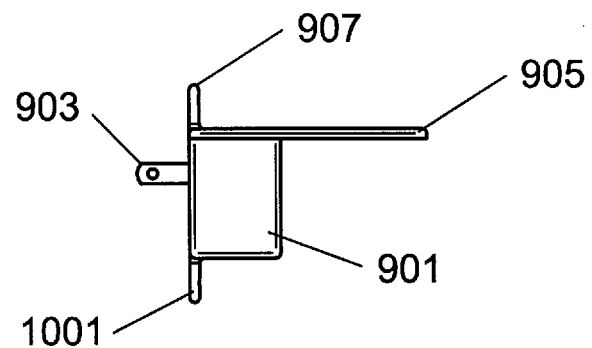
FIG. 11 is a side view of the wireless charging shelf of FIG. 9.
Figure 12:
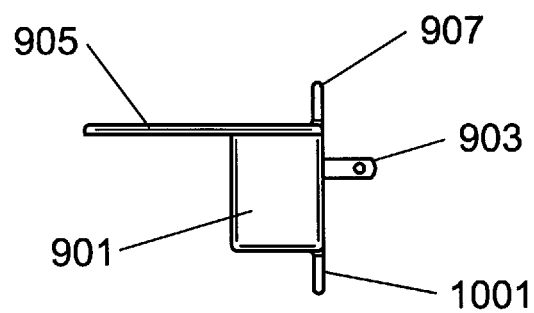
FIG. 12 is an opposing side view of the wireless charging shelf of FIG. 9.
Figure 13:
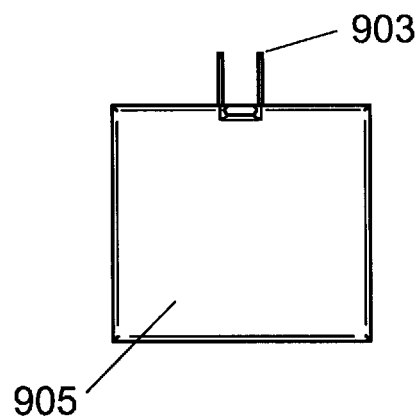
FIG. 13 is a top down view of the wireless charging shelf of FIG. 9.
Figure 14:
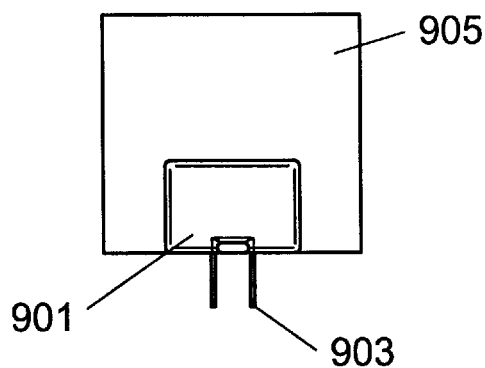
FIG. 14 is a bottom up view of the wireless charging shelf of FIG. 9.

FIG. 10 is a front plan view of the wireless charging shelf of FIG. 9 showing clearly both an upper retainer 907 and a lower retainer 1001. In various embodiments, one retainer may be present or the retainer may be placed and configured differently from that shown in FIG. 9. FIG. 11 is a side view of the wireless charging shelf of FIG. 9 and FIG. 12 is an opposing side view of the wireless charging shelf of FIG. 9. FIG. 13 is a top down view of the wireless charging shelf of FIG. 9 showing clearly the charging surface of the charging shelf 905. The charging surface may contain alignment marks, decorative features, non-slip material, a slight pitch to ensure retention of the device, magnets for retention of a device or sensing the presence of a device, lips or otherwise raised edges to ensure that the device is retained, or other similar features. The charging shelf 905 may also vary in shape and size to accommodate different electronic devices. Further, in some embodiments, there may be multiple charging shelves to allow for simultaneous charging of more than one device. FIG. 14 is a bottom up view of the wireless charging shelf of FIG. 9 showing the plug 901 and the contacts 903.

Figure 15:
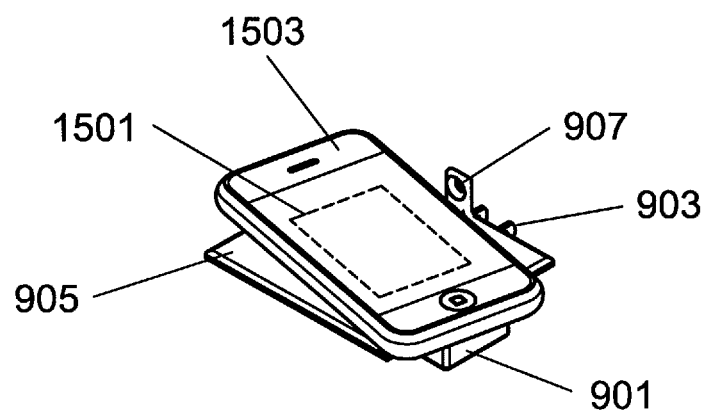
FIG. 15 shows the wireless charging shelf of FIG. 9 in use.

Now turning to FIG. 15, the wireless charging shelf of FIG. 9 is shown in use. For clarity, the electrical receptacle and related building or wall structure is not depicted. The device 1503 contains a receiver 1501 which contains a coil, coils, inductive, resonant, radiofrequency or other components to allow for the wireless reception of electrical power. The receiver 1501 may be built into a battery cover or other structure, built into the device itself, or otherwise electrically coupled to charging circuitry and related electrical storage. For a better understanding of the electrical and electronic aspects of the present invention, FIGS. 33 and 34 will be described in detail later in this specification.

Figure 16:
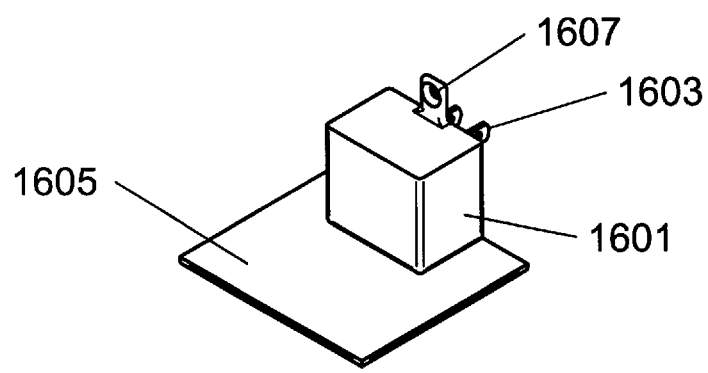
FIG. 16 shows the wireless charging shelf with the charging surface located below the electrical connector.

FIG. 16 shows the wireless charging shelf with the charging surface located below the electrical connector. FIG. 16 is similar to FIG. 8, the difference being primarily that there is not a spare or available electrical receptacle contained in the plug 1601. The plug 1601 is depicted with contacts 1603, a charging shelf 1605 and retainer 1607. Variations on geometry, materials, and physical structure may be made without departing from the spirit and scope of the present invention.

The wireless charging shelf may also be placed at an angle or slope, or have a generally angular orientation with respect to the operational horizontal plane. This angular orientation allows a device to be placed on the charging shelf with the device visible. This may be useful, for example, when the device contains a display where information may be displayed or otherwise visible while the device is being charged. Examples of such information include, but are not limited to, a clock display, a display of photographs, videos, or other pleasing images, caller or sender identification, and the like. The angled charging shelf may also be configured to allow the device to be placed on the angled charging shelf in either portrait or landscape orientation. The angled charging shelf may allow only one orientation, or in some embodiments of the present invention, allow for a user to place their device in either orientation depending on personal preference. Various retention techniques may be used to prevent a device being charged from sliding from the angled charging shelf, examples of such techniques being described herein.

FIGS. 17-24 depict a wireless charging shelf where the charging surface is angled.

Figure 17:
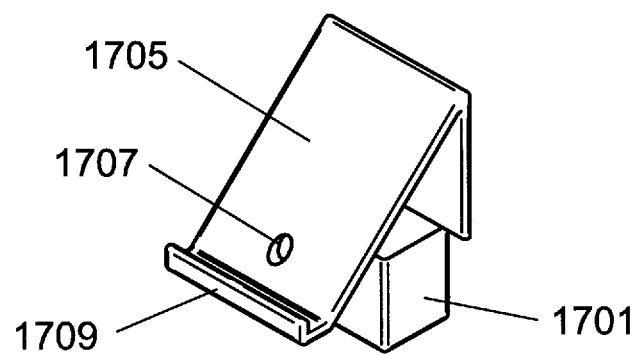
FIG. 17 is a perspective view of the wireless charging shelf according to another embodiment of the present invention.
Figure 18:
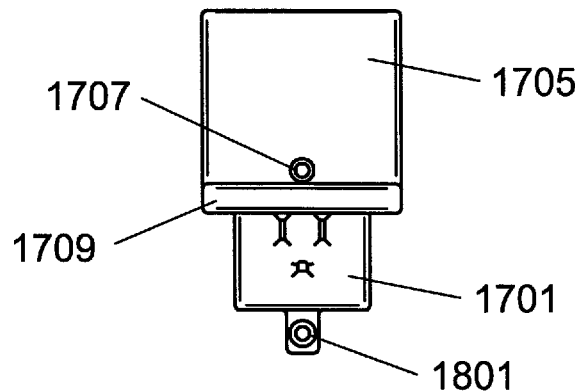
FIG. 18 is a front plan view of the wireless charging shelf of FIG. 17.
Figure 19:
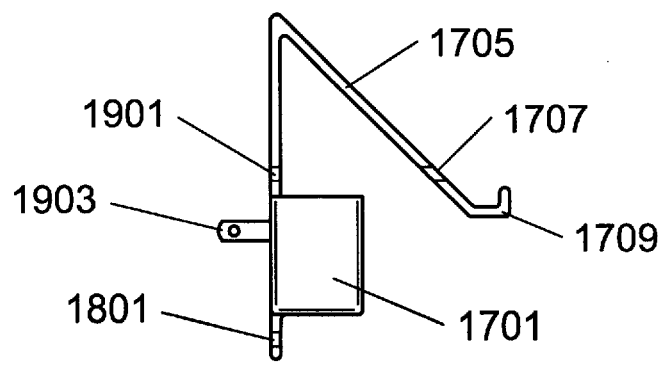
FIG. 19 is a side view of the wireless charging shelf of FIG. 17.

FIG. 17 is a perspective view of the wireless charging shelf with an angled charging surface. A plug 1701 is evident. The plug may either accommodate Alternating Current or Direct Current or variations thereof, although the prevalent power distribution system of today is based on Alternating Current (AC). The plug 1701 removably connects the wireless charging shelf to a wall socket, power point, power socket, electric receptacle, plug socket, electrical outlet, or the like, each of these terms being used to describe similar structures. The plug 1701 typically has exposed contacts 1903 (see FIG. 19), but may also, in some embodiments, have sockets or related female contact structures. It should be noted that while the plug 1701 is for removable use, it may be desirable to secure the plug 1701 and related structure to the electrical receptacle. Therefore, a retainer is provided that allows one to use an existing fastener on the electrical receptacle to secure the wireless charging shelf, eliminating the risk of it becoming unplugged and falling from the wall along with the device. The plug 1701 may be of North American standards, or may comply with other standards. The plug 1701 may be of various types, including but not limited to, Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. The angled charging shelf 1705 is located in proximity to the plug 1701, and in some embodiments of the present invention is mechanically or otherwise coupled to the plug 1701. The charging shelf contains a radiating structure such as a coil, coils, inductive, resonant, radiofrequency or other components to allow for the wireless transmission of electrical power. The shelf may be made of a plastic with these components embedded or otherwise contained therein. The coil, coils, inductive, resonant, radiofrequency or other components are electrically connected to the contacts 1903. There may also be intermediary electronics or electrical components to further process the receptacle power before the power traverses the coils, inductive, resonant, radiofrequency or other components. These components are not shown in FIG. 17 as they are embedded within the angled charging shelf 1705. An upper retainer 1901 can be seen in FIG. 19. In FIG. 17, an access hole 1707 can be seen to allow a screwdriver or similar tool to gain access to the upper retainer. Also shown in FIG. 17 is a stop 1709 that is a physical structure to retain and otherwise place a device to be charged. The stop 1709 may be made from the same material as the angled charging shelf 1705 such as a plastic or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. The stop 1709 may also be made from a material such as a metal or a magnetic material. In addition, a non-slip surface may be applied to the angled charging shelf 1705. Examples of non-slip surfaces include elastomeric materials such as a thermoplastic elastomer. An example of a thermoplastic elastomer is SANTOPRENE™ from Advanced Elastomer Systems, Akron, Ohio. In use; a device containing the appropriate receiver is placed on the charging shelf and power is transferred from the charging shelf to a receiver in the device and then on to charging and storage circuitry within or attached to the device. To prevent the plug 1701 and associated angled charging shelf 1705 from being pulled from the electrical receptacle and falling, retainers are provided to allow the placement of an existing fastener from the electrical receptacle through the retainer. An upper retainer 1901 is depicted in FIG. 19 that would provide fastening to a Decora® or decorator style electrical receptacle. Decora® is a registered trademark of Leviton Manufacturing Company of Little Neck, N.Y. In FIG. 18, a lower retainer 1801 is depicted that would provide fastening to a traditional duplex style electrical receptacle. Other locations and placement of retainers may also be present in various embodiments of the present invention. The retainers may be made from a plastic, a metal, or similar materials. To use the wireless charging shelf, the contacts 1903 are inserted into an appropriate electrical receptacle, a retainer or retainers such as the upper retainer 1901 or the lower retainer 1801 receive a fastener from the electrical receptacle, and the wireless charging shelf may then be used to receive an electronic device with an appropriate wireless power receiver. In some embodiments, only one retainer is used and the other broken off or otherwise removed, or the wireless charging shelf is made available with only an upper or a lower retainer, or a similar retainer is used to ensure safety. The wireless charging shelf may be may be molded using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. Other materials such as metal for contacts and wiring, and other electrical components, may be used.

Figure 20:
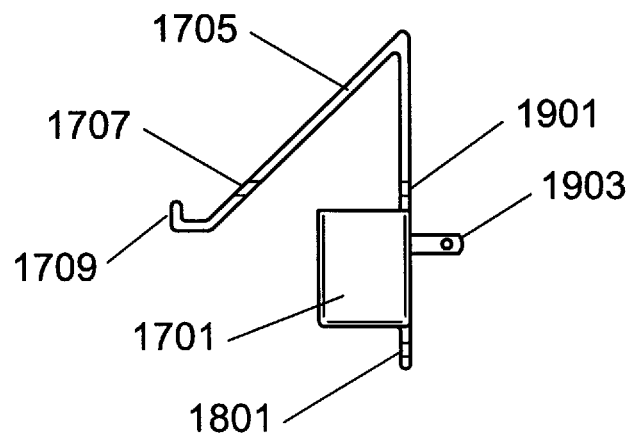
FIG. 20 is an opposing side view of the wireless charging shelf of FIG. 17.
Figure 21:
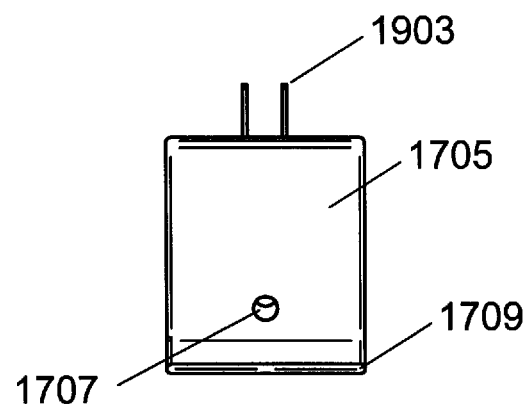
FIG. 21 is a top down view of the wireless charging shelf of FIG. 17.
Figure 22:
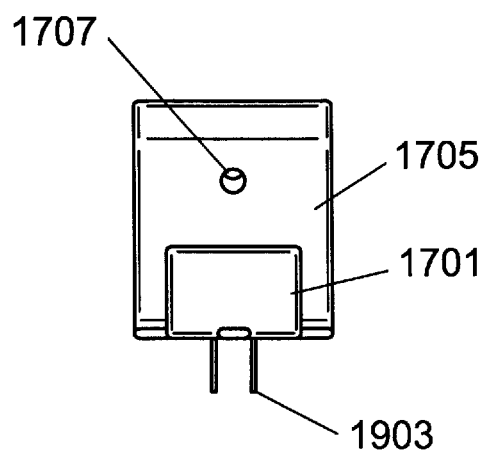
FIG. 22 is a bottom up view of the wireless charging shelf of FIG. 17.

FIG. 18 is a front plan view of the wireless charging shelf of FIG. 17 showing an access hole 1707 and a lower retainer 1801. In various embodiments, one retainer may be present or the retainer may be placed and configured differently from that shown in FIG. 18. FIG. 19 is a side view of the wireless charging shelf of FIG. 17 and FIG. 20 is an opposing side view of the wireless charging shelf of FIG. 17. FIGS. 19 and 20 show contacts 1903 made of a conductive material for placing into an electrical receptacle. In addition, a retainer hole 1901 is shown to use an existing fastener of a cover plate and provide fastening to a Decora® or decorator style electrical receptacle. Decora® is a registered trademark of Leviton Manufacturing Company of Little Neck, N.Y. FIG. 21 is a top down view of the wireless charging shelf of FIG. 17 showing clearly the charging surface of the angled charging shelf 1705. The charging surface may contain alignment marks, decorative features, non-slip material, magnets for retention of a device or sensing the presence of a device, lips or otherwise raised edges to ensure that the device is retained, or other similar features. The charging shelf 1705 may also vary in shape and size to accommodate different electronic devices. Further, in some embodiments, there may be multiple charging shelves to allow for simultaneous charging of more than one device. FIG. 22 is a bottom up view of the wireless charging shelf of FIG. 17 showing the plug 1701 and the contacts 1903.

Figure 23:
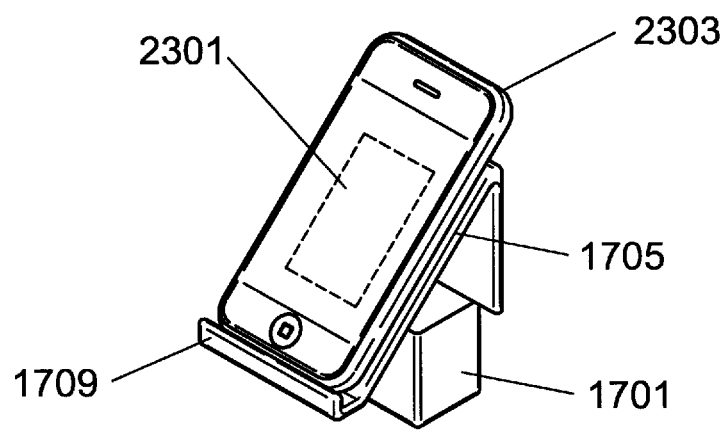
FIG. 23 shows the wireless charging shelf of FIG. 17 in use.

FIG. 23 depicts the wireless charging shelf of FIG. 17 in use. For clarity, the electrical receptacle and related building or wall structure is not depicted. The device 2303 contains a receiver 2301 which contains a coil, coils, inductive, resonant, radiofrequency or other components to allow for the wireless reception of electrical power. The receiver 2301 may be built into a battery cover or other structure, built into the device itself, or otherwise electrically coupled to charging circuitry and related electrical storage. For a better understanding of the electrical and electronic aspects of the present invention, FIGS. 33 and 34 will be described in detail later in this specification.

Figure 24:
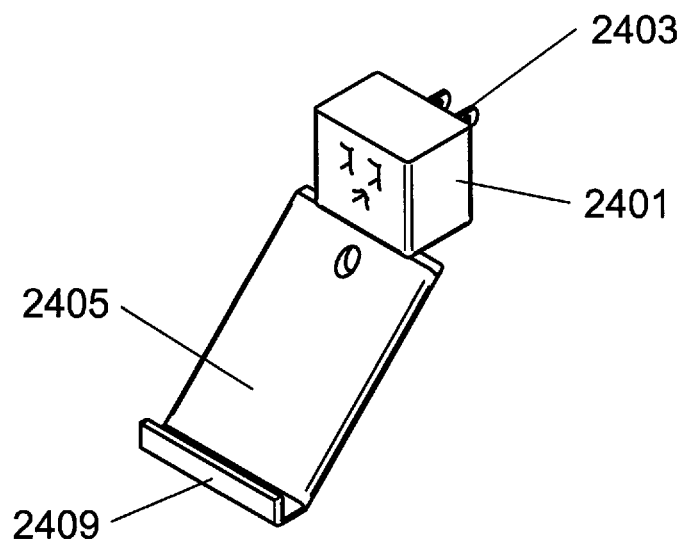
FIG. 24 shows the wireless charging shelf with the charging surface located below the electrical connector.

FIG. 24 shows the wireless charging shelf with the charging surface located below the electrical connector. Similar to FIG. 17, a plug 2401 is depicted with contacts 2403, an angled charging shelf 2405 and stop 2409. Variations on geometry, materials, and physical structure may be made without departing from the spirit and scope of the present invention.

FIGS. 17-24 depict the wireless charging shelf with a spare or available electrical receptacle contained in the plug 1701 or 2401. This spare electrical receptacle is electrically connected to the contacts such as the contacts 1903 and provides for an available electrical outlet for other uses. In this way the wireless charging shelf also does not encumber the use of available electrical outlets. This electrical receptacle may be of any type including but not limited to, Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. In addition, this electrical receptacle may also be of a low power standard such as USB or the like, or may contain communications, signaling, data or the like.

Figure 25:
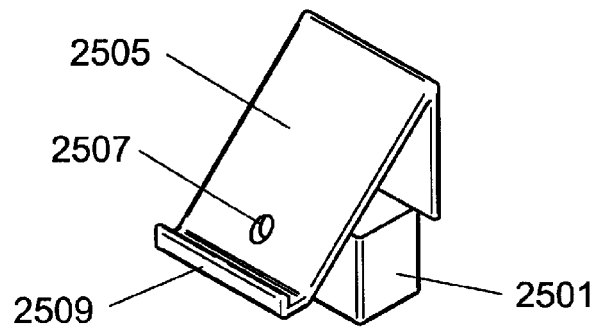
FIG. 25 is a perspective view of the wireless charging shelf according to another embodiment of the present invention.

Turning now to FIG. 25 and related FIGS. 26-31 and 32, a perspective view of the wireless charging shelf according to another embodiment of the present invention is depicted. FIGS. 25-32 are similar to FIGS. 17-24, the difference being primarily that there is not a spare or available electrical receptacle contained in the plug 2501 or 3201.

Figure 26:
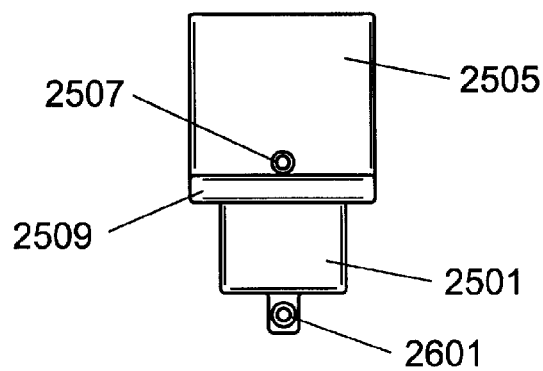
FIG. 26 is a front plan view of the wireless charging shelf of FIG. 25.
Figure 27:
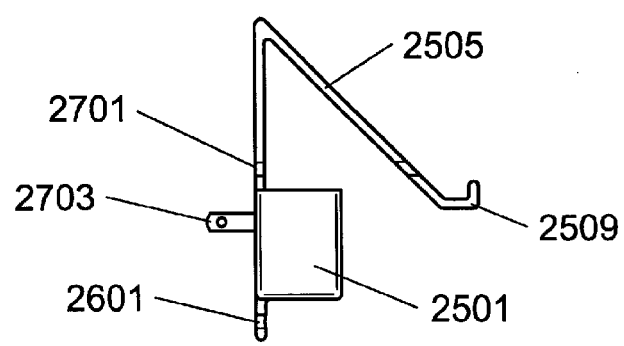
FIG. 27 is a side view of the wireless charging shelf of FIG. 25.

FIG. 25 is a perspective view of the wireless charging shelf with an angled charging surface. A plug 2501 is evident. The plug may either accommodate Alternating Current or Direct Current or variations thereof, although the prevalent power distribution system of today is based on Alternating Current (AC). The plug 2501 removably connects the wireless charging shelf to a wall socket, power point, power socket, electric receptacle, plug socket, electrical outlet, or the like, each of these terms being used to describe similar structures. The plug 2501 typically has exposed contacts 2703 (see FIG. 27), but may also, in some embodiments, have sockets or related female contact structures. It should be noted that while the plug 2501 is for removable use, it may be desirable to secure the plug 2501 and related structure to the electrical receptacle. Therefore, a retainer is provided that allows one to use an existing fastener on the electrical receptacle to secure the wireless charging shelf, eliminating the risk of it becoming unplugged and falling from the wall along with the device. The plug 2501 may be of North American standards, or may comply with other standards. The plug 2501 may be of various types, including but not limited to, Type A, NEMA 1-15, JIS C 8303 Class II, Type B, NEMA 5-15, NEMA 5-20, Type C, Europlug, CEE 7/16, Type D, BS 546, Type E, CEE 7/5, Type F, CEE 7/4, Type E/F Hybrid, CEE 7/7, Type G, BS 1363, Type H, SI 32, Type I, AS/NZS 3112, CPCS-CCC, IRAM 2073, Type J, SEV 1011, Type K, Section 107-2-D1, Type L, CEI 23-16/VII, Type M, BS 546, polarized or unpolarized, and the like. The angled charging shelf 2505 is located in proximity to the plug 2501, and in some embodiments or the present invention is mechanically or otherwise coupled to the plug 2501. The charging shelf contains a radiating structure such as a coil, coils, inductive, resonant, radiofrequency or other components to allow for the wireless transmission of electrical power. The shelf may be made of a plastic with these components embedded or otherwise contained therein. The coil, coils, inductive, resonant, radiofrequency or other components are electrically connected to the contacts 2703. There may also be intermediary electronics or electrical components to further process the receptacle power before the power traverses the coils, inductive, resonant, radiofrequency or other components. These components are not shown in FIG. 25 as they are embedded within the angled charging shelf 2505. An upper retainer 2701 can be seen in FIG. 27. In FIG. 25, an access hole 2507 can be seen to allow a screwdriver or similar tool to gain access to the upper retainer. Also shown in FIG. 25 is a stop 2509 that is a physical structure to retain and otherwise place a device to be charged. The stop 2509 may be made from the same material as the angled charging shelf 2505 such as a plastic or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. The stop 2509 may also be made from a material such as a metal or a magnetic material. In addition, a non-slip surface may be applied to the angled charging shelf 2505. Examples of non-slip surfaces include elastomeric materials such as a thermoplastic elastomer. An example of a thermoplastic elastomer is SANTOPRENE™ from Advanced Elastomer Systems, Akron, Ohio. In use, a device containing the appropriate receiver is placed on the charging shelf and power is transferred from the charging shelf to a receiver in the device and then on to charging and storage circuitry within or attached to the device. To prevent the plug 2501 and associated angled charging shelf 2505 from being pulled from the electrical receptacle and falling, retainers are provided to allow the placement of an existing fastener from the electrical receptacle through the retainer. An upper retainer 2701 is depicted in FIG. 27 that would provide fastening to a Decora® or decorator style electrical receptacle. Decora® is a registered trademark of Leviton Manufacturing Company of Little Neck, N.Y. In FIG. 26, a lower retainer 2601 is depicted that would provide fastening to a traditional duplex style electrical receptacle. Other locations and placement of retainers may also be present in various embodiments of the present invention. The retainers may be made from a plastic, a metal, or similar materials. To use the wireless charging shelf the contacts 2703 are inserted into an appropriate electrical receptacle, a retainer or retainers such as the upper retainer 2701 or the lower retainer 2601 receive a fastener from the electrical receptacle, and the wireless charging shelf may then be used to receive an electronic device with an appropriate wireless power receiver. In some embodiments, only one retainer is used and the other broken off or otherwise removed, or the wireless charging shelf is made available with only an upper or a lower retainer, or a similar retainer is used to ensure safety. The wireless charging shelf may be may be molded using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. Other materials such as metal for contacts and wiring, and other electrical components, may be used.

Figure 28:
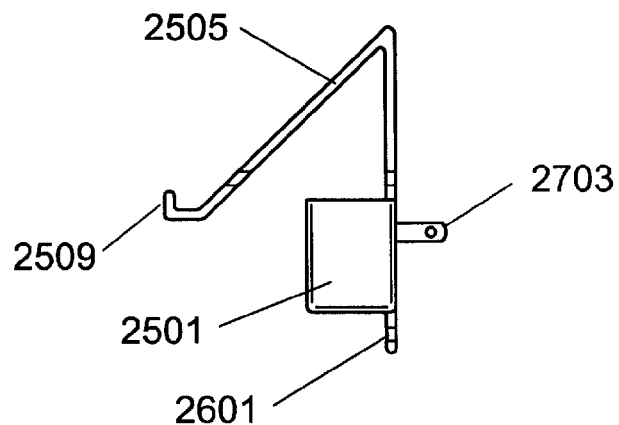
FIG. 28 is an opposing side view of the wireless charging shelf of FIG. 25.
Figure 29:
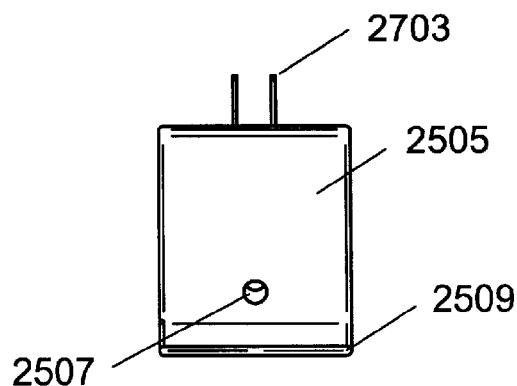
FIG. 29 is a top down view of the wireless charging shelf of FIG. 25.
Figure 30:
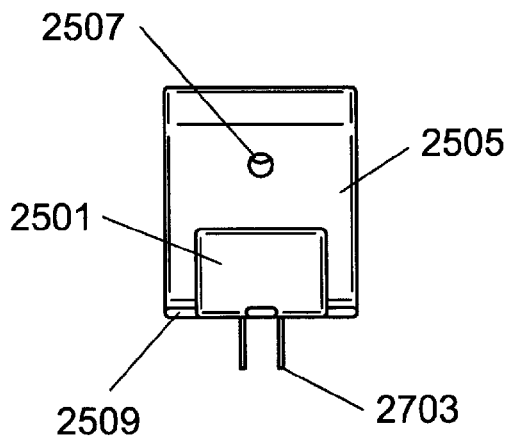
FIG. 30 is a bottom up view of the wireless charging shelf of FIG. 25.

FIG. 26 is a front plan view of the wireless charging shelf of FIG. 25 showing an access hole 2507 and a lower retainer 2601. In various embodiments, one retainer may be present or the retainer may be placed and configured differently from that shown in FIG. 26. FIG. 27 is a side view of the wireless charging shelf of FIG. 25 and FIG. 28 is an opposing side view of the wireless charging shelf of FIG. 17. FIGS. 27 and 28 show contacts 2703 made of a conductive material for placing into an electrical receptacle. In addition, a retainer hole 2701 is shown to use an existing fastener of a cover plate and provide fastening to a Decora® or decorator style electrical receptacle. Decora® is a registered trademark of Leviton Manufacturing Company of Little Neck, N.Y. FIG. 29 is a top down view of the wireless charging shelf of FIG. 25 showing clearly the charging surface of the angled charging shelf 2505. The charging surface may contain alignment marks, decorative features, non-slip material, magnets for retention of a device or sensing the presence of a device, lips or otherwise raised edges to ensure that the device is retained, or other similar features. The charging shelf 2505 may also vary in shape and size to accommodate different electronic devices. Further, in some embodiments, there may be multiple charging shelves to allow for simultaneous charging of more than one device. FIG. 30 is a bottom up view of the wireless charging shelf of FIG. 25 showing the plug 2501 and the contacts 2703.

Figure 31:
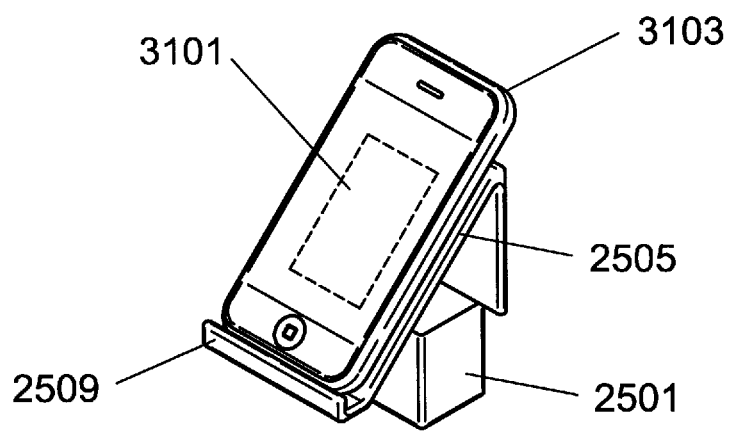
FIG. 31 shows the wireless charging shelf of FIG. 25 in use.

FIG. 31 depicts the wireless charging shelf of FIG. 25 in use. For clarity, the electrical receptacle and related building or wall structure is not depicted. The device 3103 contains a receiver 3101 which contains a coil, coils, inductive, resonant, radiofrequency or other components to allow for the wireless reception of electrical power. The receiver 3101 may be built into a battery cover or other structure, built into the device itself, or otherwise electrically coupled to charging circuitry and related electrical storage. For a better understanding of the electrical and electronic aspects of the present invention, FIGS. 33 and 34 will be described in detail later in this specification.

Figure 32:
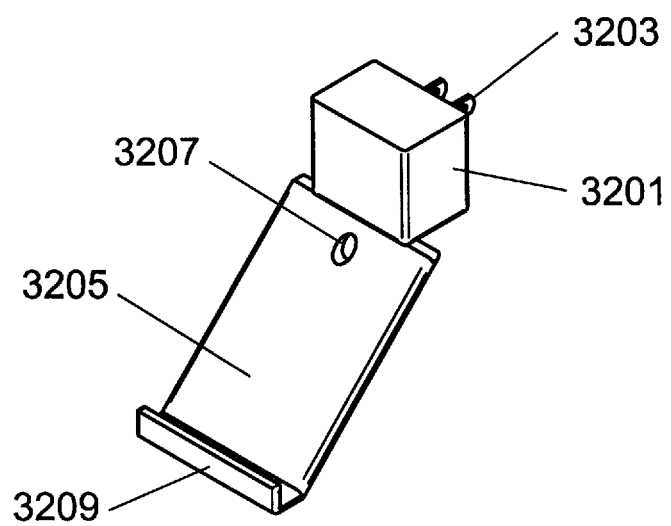
FIG. 32 shows the wireless charging shelf with the charging surface located below the electrical connector.

FIG. 32 shows the wireless charging shelf with the charging surface located below the electrical connector. Similar to FIG. 25, a plug 3201 is depicted with contacts 3203, an angled charging shelf 3205 and stop 3209. Variations on geometry, materials, and physical structure may be made without departing from the spirit and scope of the present invention.

Figure 33:
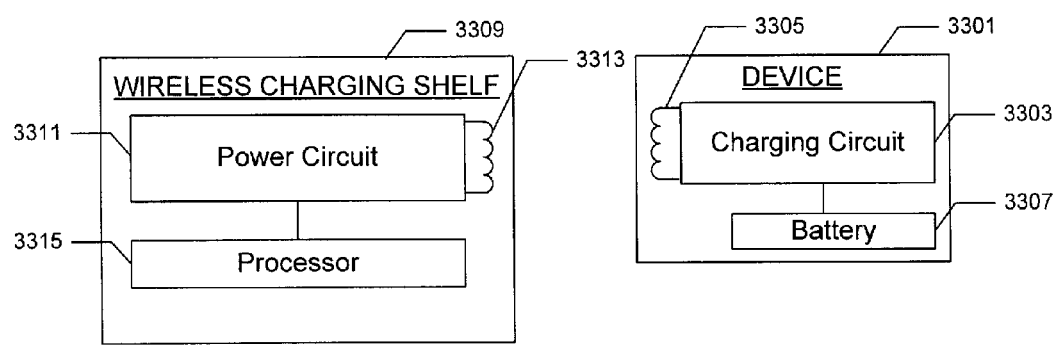
FIG. 33 is a block schematic of the wireless charging system.

To further understand the electrical devices and electronics of the wireless charging shelf, FIG. 33 is a block schematic of the wireless charging system. The various electrical components of the wireless charging shelf depicted in FIG. 33 may be entirely contained within the charging shelf itself, or may be contained in other housing such as the plug or similar structure. In a wireless charging system, there are essentially two elements—a power source and a power receiver. The use of inductive, resonant, radiofrequency or other electromagnetic means of transferring electrical power from a power source to a power receiver will generally use a form of coil or similar radiating structure. When electrical power travels through a radiating structure that is properly designed to accommodate the frequency and amplitude of the electrical power, it will radiate or transmit some or all of that electrical power to a receiving structure that is also properly designed to accommodate the frequency and amplitude of the electrical power. These techniques are known to those skilled in the art, and form the basis for electrical transformer design, radiofrequency device design, and the like. In FIG. 33, the device 3301 is the power receiver and the wireless charging shelf is the power source. The device 3301 may contain a coil or similar receiving structure 3305, or the coil or similar receiving structure may otherwise be electrically coupled to the device 3301. Examples of such topologies include, but are not limited to, a receiving structure contained within a battery assembly for the device, a receiving structure contained within a cover for the device, or a receiving structure integrated within the device. A charging circuit 3303 is electrically coupled to the receiving structure 3305 and further electrically coupled to a battery 3307. The charging circuit 3303 takes in the electrical power from the receiving structure 3305 and provides conditioning and control of the electrical power before it is received by the battery under charge 3307. It should be noted that other electrical storage devices may also be used in place of a battery 3307 such as, for example, an ultracapacitor. The wireless charging shelf 3309 contains a charging shelf with a radiating structure 3313 embedded or otherwise contained therewith. This wireless power transmission radiating structure 3313 may be a coil, an antenna, or other such structure for emitting electromagnetic radiation. As wireless charging technology develops, it is believed that standards will evolve. The present invention and the various embodiments described and envisioned herein will adapt to these standards over time, as these various standards may be required for commercialization. These standards will not, however, depart from the spirit and broad scope of the wireless charging shelf as described herein. Within the wireless charging shelf or contained in suitable packaging and coupled to the wireless charging shelf is a power circuit 331 that is electrically coupled to the radiating structure 3313. The power circuit provides the proper electrical power to the radiating structure 3313 such that the most efficient wireless transfer of power occurs. The power circuit 3313 therefore performs functions such as power conditioning, correcting for frequency and amplitude of the provided electrical power to the radiating structure. The power circuit 3313 may also contain on/off functionality to power down the wireless charging shelf when not in use or when charging is complete. The power circuit 3313 may also contain specific power delivery parameters to condition or otherwise optimally charge a given battery type. For example, Nickel Metal Hydride, Lithium Ion, and other batteries may benefit from specific charging profiles where charging power is delivered and varied over a given charging period. In some embodiments of the present invention, a processor 3315 may be incorporated that provides various other desirable features for the wireless charging shelf. The processor 3315 has an interface to the power circuit 3311 and may also contain sensing components to enable some of the functionality described by way of FIG. 34. Sensing components may include, but are not limited to battery voltage detection, device call progress or call status detection, device interfaces such as Bluetooth and other wireless protocols, and the like.

Figure 34:
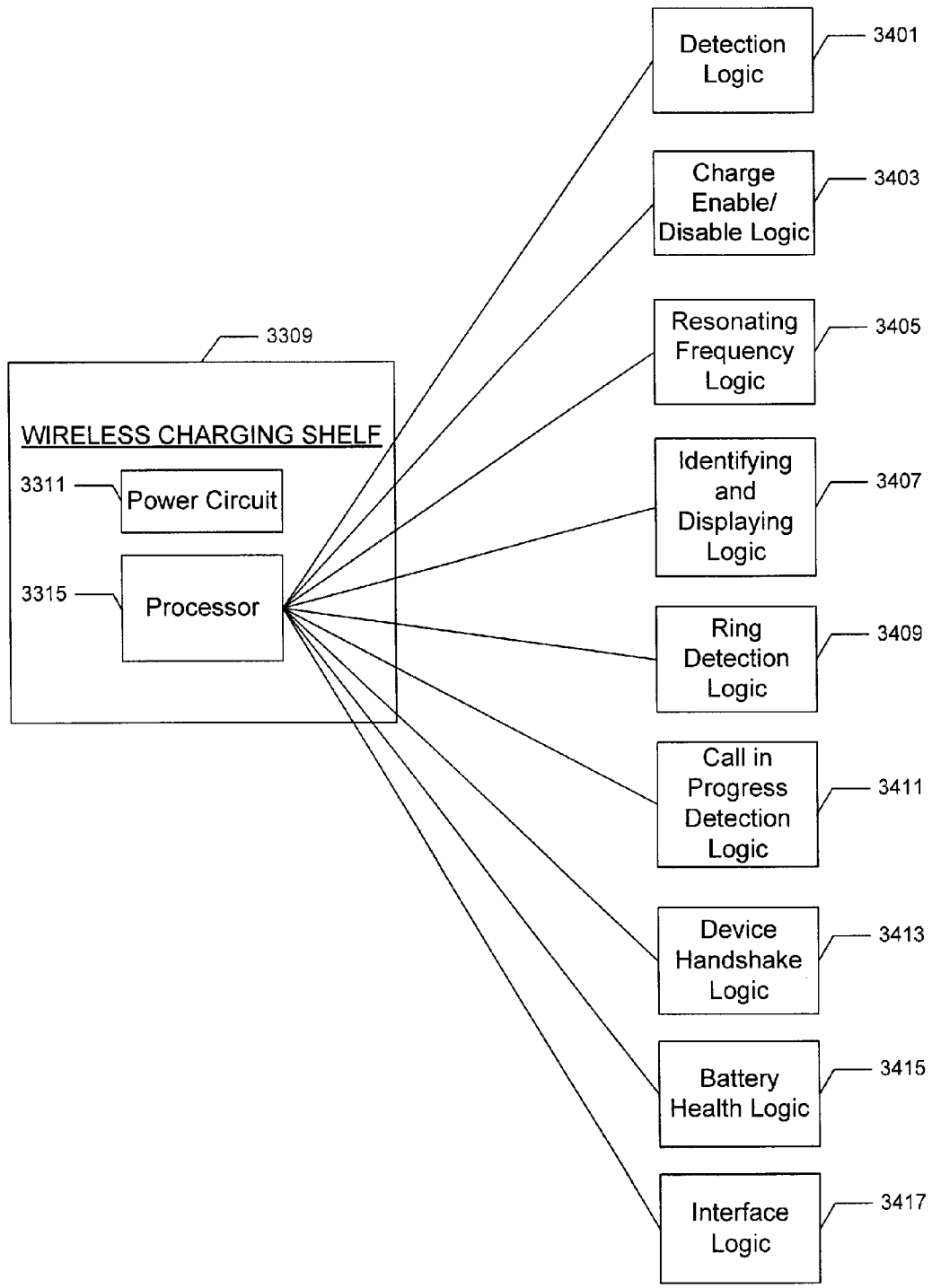
FIG. 34 is a block diagram of exemplary enhanced functionality of the wireless charging system.

FIG. 34 is a block diagram of exemplary enhanced functionality of the wireless charging system. As stated previously, the wireless charging shelf 3309 contains a power circuit 3311 and may optionally contain a processor 3315. The radiating structure is not shown in FIG. 34 for clarity. With a processor, many enhanced features and functionality are possible. These features and functionality may or may not be present with any given wireless charging shelf. Examples include detection logic 3401 where the wireless charging shelf is able to detect the presence of a device to be charged, and turns the power on or off to the wireless charging shelf based on the presence of a device. The detection logic 3401 may also detect fault conditions such as excess power demand and the like. The detection logic 3401 may use current sensing to enable such detection logic, voltage detection, modulation or other such techniques. Charge enable/disable logic 3403 may detect when a charge cycle is complete and turn off the wireless charging shelf upon charge completion. The charge enable/disable logic 3403 may use current sensing, voltage detection, modulation, signaling or other such techniques. Charge enable/disable logic 3403 may also include charge conditioning techniques to properly charge and condition a given battery type. In some wireless power transmission systems, resonant frequency is important to the proper wireless transfer of power. There may be, in some embodiments of the present invention, resonating frequency logic 3405 that detects and corrects for the proper resonant frequency. This may be useful if the device being charged is not properly aligned on the charging surface, or if different devices may have different resonant frequency characteristics. Further, identifying and displaying logic 3407 may also be present which senses, through current, voltage or other means, when a device is placed on the wireless charging shelf. There may also be magnets or magnetic sensors that sense the presence of a device on the wireless charging shelf. When a device is detected and identified, a specified display mode is entered. This may be, for example, display of a clock, a calendar, photos, videos, or the like. In many of these processor driven features, there may be a user interface to allow customization or selection of features. This user interface may be in the device itself with appropriate signaling between the device and the wireless charging shelf. There may also be ring detection logic 3409 that senses when a device on the wireless charging shelf is ringing. Upon removing the device from the wireless charging mat, signaling of such removal by way of current, voltage, magnetic or other detection is passed to the device and the device will then answer the call. In a similar way, call in progress detection logic 3411 will sense when a call is in progress and the device is placed on the wireless charging shelf, enabling the speaker phone of the device. This may prove useful if, for example, one is engaged in a voice call on a device and the battery becomes low and in need of a charge. The call in progress detection logic 3411 would prevent interruption of the call due to a weak battery in need of a charge. There may also be the need for detecting a certain manufacturer's device for security, feature enablement, and the like. Therefore, device handshake logic 3413 may be present which detects and acknowledges a manufacturer's unique signaling handshake which may be signaling by way of the wireless power transfer itself, such as a carrier signal imposed on the wireless power that contains a unique signaling identifier, message, digital word, or the like. There may also be battery health logic 3413 that senses voltage and current being supplied to ascertain the health of a battery within a device being charged on the wireless charging shelf. Further, interface logic 3417 may be required or otherwise provisioned within the wireless charging shelf to receive, and in some instances, send, information to the device being charged. This interface logic 3417 may enable further features and functionality, may be useful with the exemplary features and functionality described herein, or may be needed to support emerging standards for wireless charging. Signaling to support this interface logic 3417 between the wireless charging shelf and the device may vary, but may include carrier frequencies on wireless power, separate low power radiofrequency signaling, optical signaling, magnetic field signature signaling, or the like. In addition, the logic described herein may or may not be present in various embodiments of the present invention, and further even the processor itself may or may not be present in various embodiments of the present invention. These enhanced features are, however, considered within the spirit and broad scope of the present invention and the various embodiments described and envisioned herein.

Figure 37:
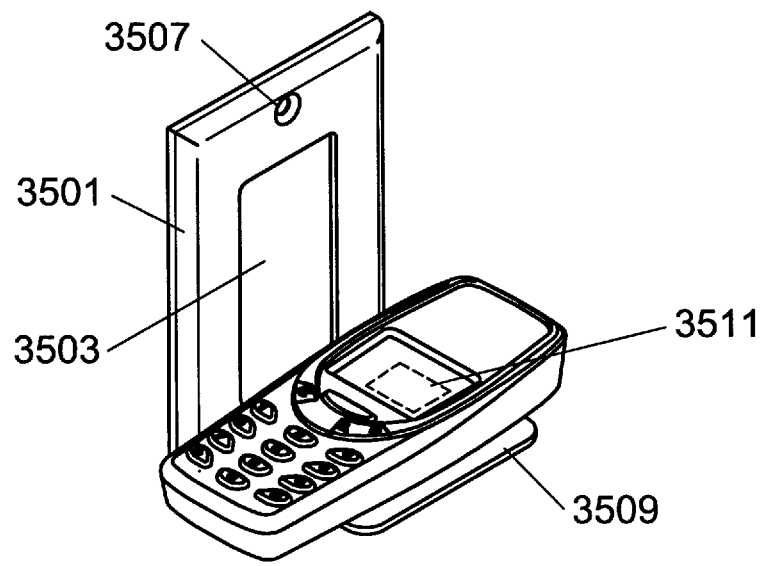
FIG. 37 is a perspective view of another embodiment of a cover plate having a wireless charging shelf.
Figure 38:
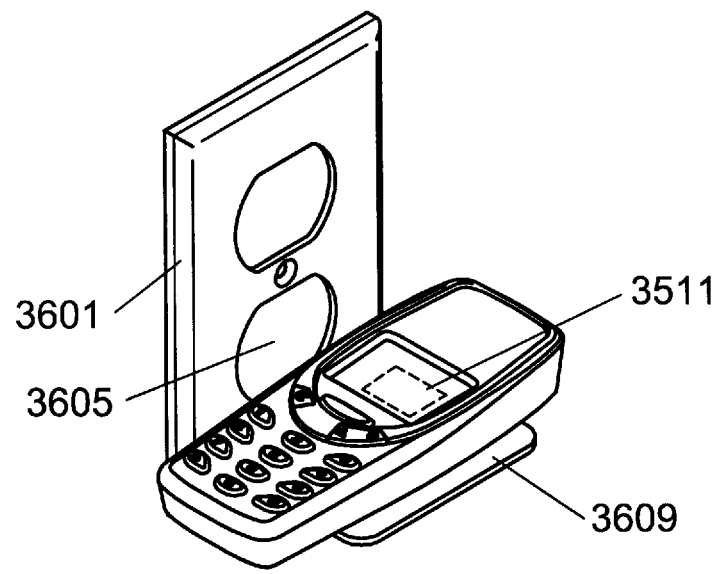
FIG. 38 is a perspective view of another embodiment of a duplex cover plate having a wireless charging shelf.
Figure 39:
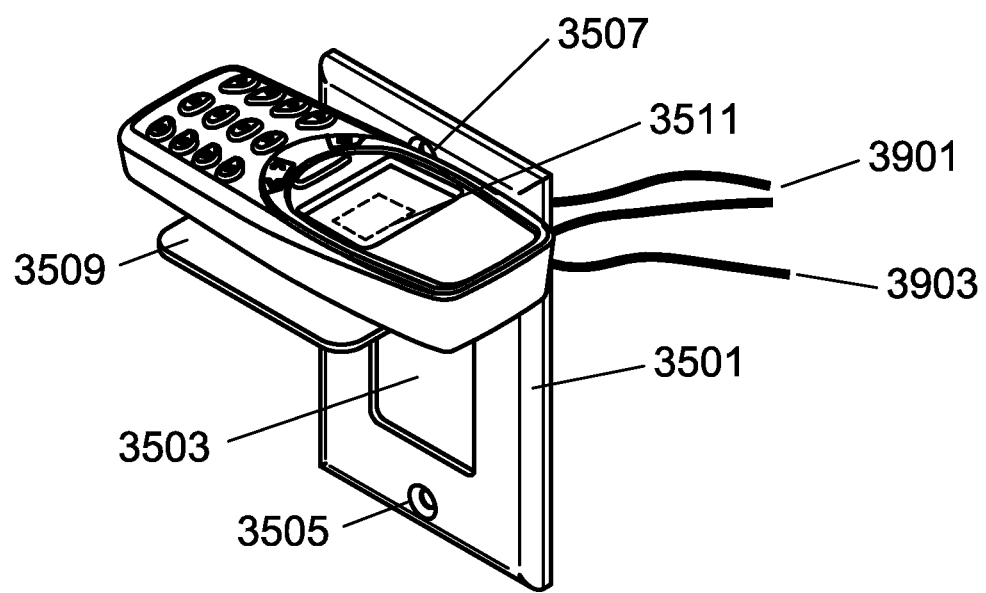
FIG. 39 is an example of a cover plate laving a wireless charging shelf where the lard wiring can be seen.

Lastly, FIGS. 35-39 depict a wireless charging shelf as part of a cover plate for replacing an existing cover plate with a wireless charging shelf cover plate. The wireless charging shelf is similar to that previously described. Contact with electrical power may be made through a plug integrated with the wireless charging shelf cover plate. For example, adding a cover plate to the embodiments of the wireless charging shelf previously described herein. In some embodiments, contact with electrical power may be made through hard wiring to the receptacle itself or a source of electrical power within the receptacle box as shown in FIG. 39.

Figure 35:
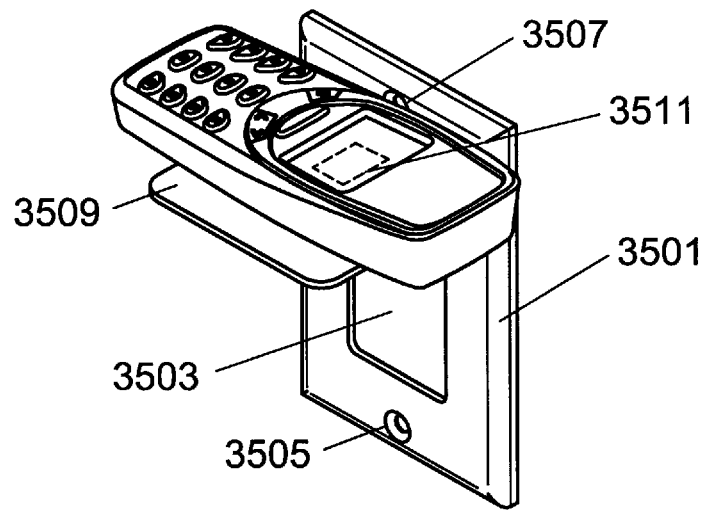
FIG. 35 is a perspective view of a cover plate having a wireless charging shelf.

FIG. 35 depicts a perspective view of a cover plate having a wireless charging shelf for a Decora® or decorator style electrical receptacle. Decora® is a registered trademark of Leviton Manufacturing Company of Little Neck, N.Y. Depicted is a cover plate 3501 having an opening 3503 for a wiring device, mounting holes 3505 and 3507, and a wireless charging shelf 3509. Further, a device having a wireless power receiver 3511 is depicted.

Figure 36:
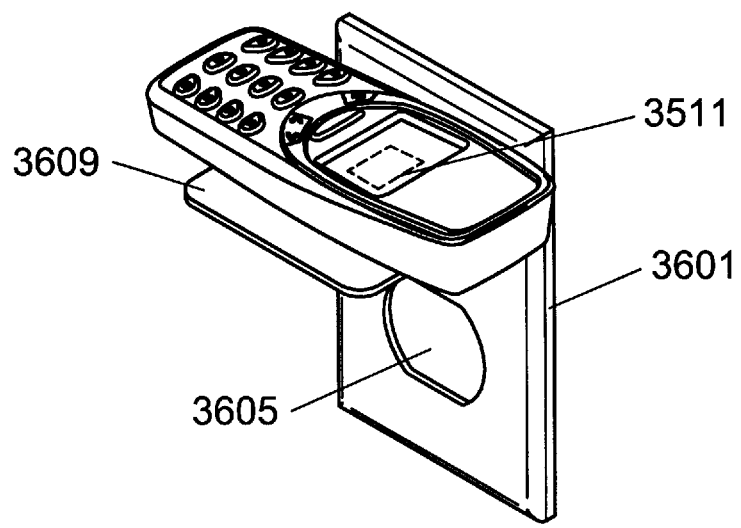
FIG. 36 is a perspective view of a duplex cover plate having a wireless charging shelf.

FIG. 36 is a perspective view of a duplex cover plate having a wireless charging shelf. A cover plate 3601 is depicted having an opening 3605 for a wiring device, a wireless charging shelf 3609. Further, a device having a wireless power receiver 3511 is depicted.

FIG. 37 is a perspective view of another embodiment of a cover plate having a wireless charging shelf where the wireless charging shelf is located below the electrical receptacle openings, and FIG. 38 is a perspective view of another embodiment of a duplex cover plate having a wireless charging shelf where the wireless charging shelf is also located below the electrical receptacle openings.

The wireless charging shelf having a cover plate may be made in a way similar to the wireless charging shelf heretofore described. The cover plate may be made of a metal or a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. Other cover plate geometries, configurations and shapes may also be used in combination with the wireless charging shelf. Placement of a shelf on an outlet cover plate is described in U.S. Pat. No. 7,812,257 to Gunderman et al, the entire disclosure of which is incorporated herein by reference.

It is, therefore, apparent that there has been provided, in accordance with the various objects of the present invention, a wireless charging shelf. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, drawings, and the claims appended herein.

What is claimed is:

1. A wireless power transmission charging shelf comprising:
   a plug having electrical contacts for insertion into an electrical receptacle;
   a charging surface formed as a shelf and comprising a wireless power transmission radiating structure within said charging surface; said charging surface assembled into said plug to create a charging surface and plug assembly that allows an electronic device to safely rest on top of the charging surface formed as a shelf without the necessity of a connector or external wire separating the plug and charging surface to provide contactless charging of said electronic device;
   wherein the plug is incapable of rotating with respect to the charging surface to allow the electronic device to safely rest on the charging surface;
   a power circuit contained within said charging surface and plug assembly, said power circuit being electrically coupled to said wireless power transmission radiating structure; and
   electrical connections contained within said charging surface and plug assembly for electrically connecting said power circuit contained within the charging surface and plug assembly to the electrical contacts of the plug.

2. The wireless charging shelf of claim 1 further comprising an upper retainer.

3. The wireless charging shelf of claim 1 further comprising a lower retainer.

4. The wireless charging shelf of claim 1 further comprising a pass through receptacle.

5. The wireless charging shelf of claim 1 wherein said charging surface is generally horizontal in use.

6. The wireless charging shelf of claim 1 wherein said charging surface has an angular orientation in use.

7. The wireless charging shelf of claim 6 further comprising a stop.

8. The wireless charging shelf of claim 6 further comprising a magnet.

9. The wireless charging shelf of claim 1 further comprising a processor.

10. The wireless charging shelf of claim 9 wherein the processor contains detection and charge enabling and disabling logic.

11. The wireless charging shelf of claim 9 wherein the processor contains resonating frequency logic.

12. The wireless charging shelf of claim 9 wherein the processor contains identifying and displaying logic.

13. The wireless charging shelf of claim 9 wherein the processor contains ring detection logic.

14. The wireless charging shelf of claim 9 wherein the processor contains call in progress detection logic.

15. The wireless charging shelf of claim 9 wherein the processor contains device handshake logic.

16. A system for charging an electronic device, the system comprising:
   a wireless power transmission charging shelf comprising a plug having electrical contacts for insertion into an electrical receptacle;
   a charging surface formed as a shelf and comprising a wireless power transmission radiating structure within said charging surface; said charging surface assembled into said plug to create a charging surface and plug assembly that allows an electronic device to safely rest on top of the charging surface formed as a shelf without the necessity of a connector or external wire separating the plug and charging surface to provide contactless charging of said electronic device;
   wherein the plug is incapable of rotating with respect to the charging surface to allow the electronic device to safely rest on the charging surface;
   a power circuit contained within said charging surface and plug assembly, said power circuit being electrically coupled to said wireless power transmission radiating structure; and
   electrical connections contained within said charging surface and plug assembly for electrically connecting said power circuit contained within the charging surface and plug assembly to the electrical contacts of the plug; and
   a wireless power receiving structure operatively coupled to an electronic device.

17. A cover plate for covering a wall box mountable wiring device mounted in and to a wall box, said wall box having a width dimension and a height dimension, said cover plate having a width dimension greater than said wall box width dimension and a height dimension greater than said wall box height dimension, the cover plate comprising:
   a unitary, generally planar attachment member of generally uniform width having a first end and a second end;
   at least one mounting hole for permitting said attachment member to be attached adjacent a front face of and over said wiring device mounted in and to said wall box;
   at least one opening for at least one wiring device; and
   a charging shelf comprising a wireless power transmission structure located proximate the first end to provide contactless charging of an electronic device;
   wherein the charging shelf is hard wired to a source of electrical power within the wall box.

18. The cover plate of claim 17 wherein said charging shelf has an angular orientation in use.

\* \* \* \* \*